(12) United States Patent
Sneyders et al.

(10) Patent No.: US 11,659,783 B2
(45) Date of Patent: May 30, 2023

(54) CALIBRATING CROP ROW COMPUTER VISION SYSTEM

(71) Applicant: Raven Industries, Inc., Sioux Falls, SD (US)

(72) Inventors: Yuri Sneyders, Zemst (BE); John D. Preheim, Beresford, SD (US); Jeffrey Allen Van Roekel, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 38 days.

(21) Appl. No.: 17/505,302

(22) Filed: Oct. 19, 2021

(65) Prior Publication Data

US 2022/0189063 A1 Jun. 16, 2022

Related U.S. Application Data

(63) Continuation of application No. 16/509,188, filed on Jul. 11, 2019, now Pat. No. 11,170,530.

(Continued)

(51) Int. Cl.

| | |
|---|---|
| *G06T 7/80* | (2017.01) |
| *A01B 69/00* | (2006.01) |
| *G01C 21/20* | (2006.01) |
| *G06V 20/10* | (2022.01) |
| *G06T 7/73* | (2017.01) |
| *G06V 20/56* | (2022.01) |

(52) U.S. Cl.
CPC .............. *A01B 69/00* (2013.01); *G01C 21/20* (2013.01); *G06T 7/75* (2017.01); *G06T 7/80* (2017.01); *G06V 20/188* (2022.01); *G06V 20/56* (2022.01); *G06T 2207/30188* (2013.01); *G06T 2207/30252* (2013.01)

(58) Field of Classification Search
CPC .................... A01B 69/00; G01C 21/20; G06T 2207/10012; G06T 2207/10028; G06T 2207/20056; G06T 2207/30188; G06T 2207/30244; G06T 2207/30252; G06T 7/75; G06T 7/80; G06V 20/188; G06V 20/56

See application file for complete search history.

(56) References Cited

U.S. PATENT DOCUMENTS

| | | |
|---|---|---|
| 5,911,669 A | 6/1999 | Stentz et al. |
| 6,160,902 A | 12/2000 | Dickson et al. |

(Continued)

FOREIGN PATENT DOCUMENTS

| | | |
|---|---|---|
| CN | 106338989 A | 1/2017 |
| WO | WO-2015035450 A1 | 3/2015 |
| WO | WO-2020014527 A1 | 1/2020 |

OTHER PUBLICATIONS

"European Application Serial No. 19833961.6, Extended European Search Report dated Mar. 23, 2022", 10 pgs.

(Continued)

*Primary Examiner* — Ian L Lemieux
(74) *Attorney, Agent, or Firm* — Schwegman Lundberg & Woessner, P.A.

(57) ABSTRACT

System and techniques for calibrating a crop row computer vision system are described herein. An image set that includes crop rows and furrows is obtained. Models of the field are searched to find a model that best fits the field. A calibration parameter is extracted from the model and communicated to a receiver.

20 Claims, 7 Drawing Sheets

Related U.S. Application Data

(60) Provisional application No. 62/696,741, filed on Jul. 11, 2018.

(56) References Cited

U.S. PATENT DOCUMENTS

| | | | |
|---|---|---|---|
| 6,490,539 | B1 | 12/2002 | Dickson et al. |
| 6,686,951 | B1 | 2/2004 | Dickson et al. |
| 8,019,513 | B2 | 9/2011 | Jochem et al. |
| 8,737,720 | B2 | 5/2014 | Mas et al. |
| 8,855,405 | B2 | 10/2014 | Mas et al. |
| 9,213,905 | B2 | 12/2015 | Lange et al. |
| 9,235,215 | B2 | 1/2016 | Qian et al. |
| 10,255,670 | B1 | 4/2019 | Wu et al. |
| 2007/0003107 | A1 | 1/2007 | Wei et al. |
| 2008/0065287 | A1 | 3/2008 | Han et al. |
| 2013/0235183 | A1 | 9/2013 | Redden |
| 2016/0084813 | A1 | 3/2016 | Anderson et al. |
| 2016/0157414 | A1 | 6/2016 | Ackerman et al. |
| 2019/0019281 | A1 | 1/2019 | Berghoefer et al. |
| 2019/0150357 | A1 | 5/2019 | Wu et al. |
| 2020/0020103 | A1 | 1/2020 | Sneyders et al. |
| 2020/0029488 | A1 | 1/2020 | Bertucci et al. |
| 2020/0193589 | A1 | 6/2020 | Peshlov et al. |
| 2020/0334859 | A1 | 10/2020 | Sneyders et al. |
| 2021/0000006 | A1 | 1/2021 | Ellaboudy et al. |

OTHER PUBLICATIONS

"European Application Serial No. 19833961.6, Response filed Oct. 19, 2022 to Extended European Search Report dated Mar. 23, 2022", 37 pgs.

English, Andrew, "Vision based guidance for robot navigation in agriculture", 2014 IEEE International Conference on Robotics and Automation (ICRA), IEEE,, (May 31, 2014), 1693-1698.

Kise, M, "A Stereovision-based Crop Row Detection Method for Tractor-automated Guidance", Biosystems Engineering, Elsevier, Amsterdam, NL, vol. 90, No. 4, (Apr. 1, 2005), 357-367.

"U.S. Appl. No. 16/509,188, Non Final Office Action dated Dec. 21, 2020", 22 pgs.

"U.S. Appl. No. 16/509,188, Notice of Allowance dated Jul. 12, 2021", 10 pgs.

"U.S. Appl. No. 16/509,188, Response filed May 21, 2021 to Non Final Office Action dated Dec. 21, 2020", 12 pgs.

"international Application Serial No. PCT/US2019/041469, International Preliminary Report on Patentability dated Jan. 21, 2021", 10 pgs.

"International Application Serial No. PCT/US2019/041469, International Search Report dated Sep. 30, 2019", 2 pgs.

"International Application Serial No. PCT/US2019/041469, Written Opinion dated Sep. 30, 2019", 8 pgs.

U.S. Appl. No. 16/509,188 U.S. Pat. No. 11,170,530, filed Jul. 11, 2019, Calibrating Crop Row Computer Vision System.

CALIBRATING CROP ROW COMPUTER VISION SYSTEM

PRIORITY CLAIM

This application is a continuation of Ser. No. 16/509,188, filed Jun. 11, 2019, which claims the benefit of priority to U.S. Application Ser. No. 62/696,741 filed on Jul. 11, 2018, entitled CALIBRATING CROP ROW COMPUTER VISION SYSTEM, the entire contents of which are hereby incorporated in their entirety.

TECHNICAL FIELD

Embodiments described herein generally relate to computer vision systems for vehicles and more specifically to calibrating a computer vision system used to navigate lanes or rows, such as crop related rows.

BACKGROUND

Many crops that are farmed are row crops. Row crops are arranged into rows that are generally equally spaced parallel rows in a field separated by furrows. Tending row crops generally involves passing agricultural equipment (AEQ) (e.g., tractors, planters, harvesters, irrigators, fertilizers, etc.) over the field. Generally, the AEQ should follow the rows such that support structures (e.g., wheels, treads, skids, etc.) remain in the furrows so as not to damage the crops. Further, equipment dealing directly with the crops should follow the centerline of the crop rows.

Navigation systems using an external location mechanism have been employed to facilitate automatic navigation of AEQ. These systems include using global position system (GPS) units to locate the position of AEQ with respect to crop rows. Generally, these systems use an initialization operation to determine positions through which the AEQ should pass and then provide information about the current position of AEQ in a field to facilitate navigation. An example initialization operation can include using a GPS unit to record the movement of AEQ as the row crops are planted. This recording can later be used to guide the AEQ for subsequent operations.

Computer vision (CV) can be used to guide AEQ down the crop rows. CV can be superior to external location mechanisms when for example, the external location mechanism is compromised (e.g., has inaccurate or absent positioning) or has not been initialized. A CV navigation system generally involves a sensor, such as a camera, mounted on the AEQ to collect features of the environment. These features can be used to ascertain AEQ position relative to a crop related row (e.g., a crop row or a furrow) positions and provide that information as parameters to a steering controller to control the AEQ.

Often, CV steering systems ascertain two guidance parameters that are provided to the steering controller: track-angle error (TKE) and cross-track distance (XTK). TKE involves the angle between the forward direction of the AEQ and the rows such that, when the AEQ is following the rows the TKE is 0° and when the AEQ is moving parallel to the rows the TKE is 90°. Accordingly, the TKE can be considered the current angle-of-attack for AEQ moving towards a given row. The XTK distance is the distance between the current position of the AEQ and the crop related row. Using TKE and XTK as parameters to the steering module can allow for an effective row guidance system of AEQ using CV. Thus, costs and error can be reduced in performing an initialization operation for GPS based systems, or for automatic navigation of AEQ when GPS, or other navigation systems, are unavailable.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
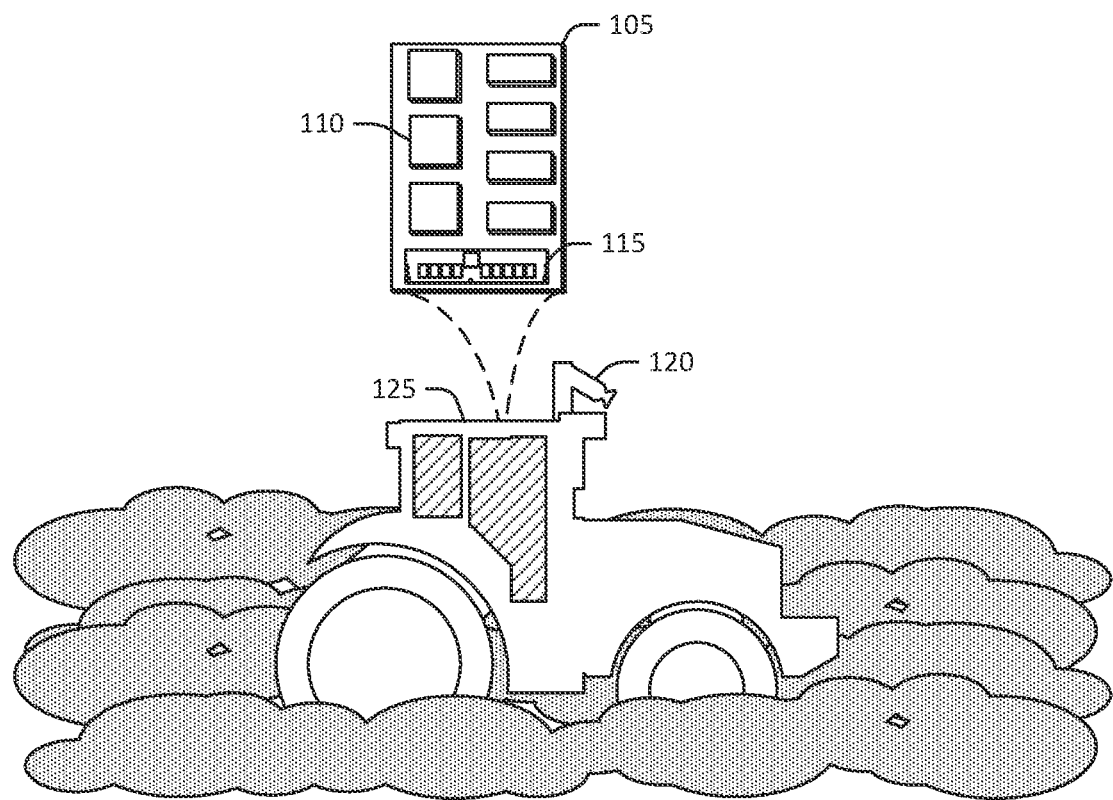
FIG. 1 is an example of an environment including a system for calibrating a crop row CV, according to an embodiment.

As noted above, crop row navigation entails using image information to determine TKE and XTK. Generally, the detection of crop related rows, and subsequent determination of TKE and XTK are performed in units of the image (e.g., pixels) and not in navigational units such as meters, feet, radians, etc. Because the navigational units are likely the units used by the AEQ's steering controller, a conversion from the image units to the navigational units is performed. Often, this conversion is accomplished via a homography. The homography is a function that translates points between perspectives of a scene, such as a field. The position, angle, and optical characteristics of a camera, for example, define the perspective of the camera. The homography can translate the points (e.g., crop row pixels or furrow pixels) to a different perspective (e.g., straitening the rows in the image). Also, something with a known scale in one perspective—such as five pixels in the bottom scanline of the image equals three feet—can be used to determine distances at other instances of the image that have a different scale (e.g., the closer to the top of the image, the more feet each pixel represents).

Several parameters are used in the homography, including an angle with which the camera observes the field (e.g., the pitch), and a height (e.g., distance) of the camera from the field. Other factors can include a yaw or roll of the camera. Generally, these parameters are configuration parameters of the CV system, entered at the time of manufacture, or a later time (e.g., by a technician in the field). While yaw and roll can generally be controlled for using the camera mount on the AEQ, such as by a leveling mount to control roll, or by aligning the camera with the AEQ to address yaw, the camera pitch and height can be variable depending on the AEQ, and even as the AEQ traverses the field. This can be an issue when the CV system is an aftermarket addition for several AEQs; each installation involving measuring and adjusting the pitch and height parameters. Entering these parameters can be both tedious and error prone, possibly resulting in a poor user experience or in a poorly performing CV navigation system.

To address the issues above, an automatic calibration of a crop row CV systems is described herein. Using an image set, the height and pitch of a sensor (e.g., camera) to the field can be determined. For example, multiple images-either from two sensors simultaneously, or from one camera in two or more physical locations—can be compared for coincidences and disparities. The coincidences can be used to identify a crossing point of the respective perspectives of the different images. Using a known relationship between the perspectives (e.g., two cameras with a known distance from each other and angle of alignment with respect to each other), both the pitch and the distance can be trigonometrically ascertained.

Multiple images can involve a more expensive set of equipment (e.g., more sensors, tighter installation or manufacturing tolerances, etc.). This issue can be addressed by using an image set with a single image. Here, a model (e.g., a numerical or mathematical model) such as a function, can be matched to, or used to approximate or emulate, the crop related rows, where a wavelength of the function (e.g., the period of a predictable or repeating part of the function) approximating a distance between rows of the same type (e.g., between crop rows). Given a known type of crop, different periods of the function can be fit to the image to determine a scaling of the rows in the image. This scaling can then be used to ascertain the calibration parameters. Additional details and examples are described below.

A model can include a periodic function (e.g., a sine or triangular function), quasiperiodic function, almost periodic function, or any other type of function or mathematical construct, such as a function or mathematical construct that includes one or more periods of a predictable pattern. In an example, a model can be selected based on ground coordinates (e.g., physical space coordinates) of crop rows, such as to cause peaks or troughs of the selected model to match or align with the crops and furrows of one or more crop row. Such model can be periodic in the ground or physical space coordinate plane due to fixed crop row spacing. Such periodic model can be transformed, such as by a homographic transformation, to the image or pixel coordinate plate to perform the modeling operations described herein. Such transformation can cause the transformed model to lose periodicity, such as to cause the model to become quasiperiodic or almost periodic, due to compression at the edges (e.g., the left and right edges) of an image relative to the center of the images. In another example, a model can be selected based on image or pixel space coordinates, such as to match or align with a distribution of crop rows in an image. In particular examples, a model (e.g., a periodic model or function such as sign function) can be selected to approximate the semi-periodic or near periodic distribution of crop rows in an image.

The terms "period", "cycle", or "wavelength", as used herein, can refer to a period, cycle, or wavelength of a periodic, quasiperiodic, almost periodic model. The terms "period", "cycle", or wavelength can also refer to a predictable or repetitive portion of any model or function used for the modeling or convolution techniques described herein.

FIG. 1 is an example of an environment including a system 105 for calibrating a crop row CV, according to an embodiment. The environment includes an AEQ 125, such as a tractor, truck, drone, or other vehicle situated proximate to crop related rows. The AEQ 125 includes a sensor 120, such as a camera, and the system 105. The sensor 120 operates by receiving light, which can be in the visible spectrum, ultraviolet, or infrared, or combinations thereof. In an example, the sensor 120 is only a light sensor, and is not a pattern-based or timing-based depth sensor, for example. Accordingly, the output of the sensor 120 is an image where elements (e.g., pixels, regions, etc.) represent wavelengths (e.g., colors) or intensities (e.g., luminance) of light.

The sensor 120 is mounted to the AEQ 125 and provides images of the field. In an example, the sensor 120 is an array of light sensors, such as cameras, with known positions and perspective relative to each other. In an example, the sensor 120 is a single light sensor (e.g., camera). In an example, the single light sensor is arranged to change its position to provide multiple perspectives at different points in time when the AEQ 125 is not moving.

The system 105 includes processing circuitry 110 and a memory 115 (e.g., computer readable media). The memory 115 is arranged to hold data and instructions for the processing circuitry 110. As noted above, several calibration parameters of the sensor 120 are used in a homography to translate measurements (e.g., crop related row detection. TKE, XTK, etc.) made in image units (e.g., pixels) into navigational units (e.g., meters). To implement automatic calibration of one or more of these calibration parameters, the processing circuitry 110 is arranged to obtain an image set of a field. Members of the image set include a representation of the field, the representation including both crop rows and furrows. Here, obtaining an image of the image set can include the processing circuitry 110 retrieving the image from a buffer (e.g., in the memory 115) or receiving the image (e.g., directly from the sensor 120 via direct memory access (DMA) or the like). (e.g., retrieved or received).

In an example, the image set includes multiple images from different perspectives. In an example, the multiple perspectives are from multiple light sensors. In an example, the multiple perspectives are from a single light sensor in two different physical positions (e.g., the sensor 120 captures an image, moves, and then captures another image). In an example, the image set includes images from one perspective. In an example, the single perspective image is a color image. In an example, the single perspective image is an intensity image derived from a color image (e.g., multiple color channels are transformed into a single channel for pixels in the image). An intensity image has a single value representation for any point in the image. Thus, in an example, the intensity image is implemented as a grayscale image. In an example, a crop row is lighter (e.g., has a greater value) than a furrow. Generally, a standard grayscale image uses luminance as the intensity measured at any given pixel. However, different manipulations to a color image can be performed to, for example, increase the contrast between different types of crop related rows. Thus, for example, if a crop row is a first color and a furrow is a second color, then the first color can be scaled to be the most intense and the second color scaled to be the least intense. In an example, the intensity image is binary, with positions being either one value (e.g., a one) or another value (e.g., a zero). Such an image can be easier to process and store, and can be achieved in several ways, including threshold clustering, or other color transformations.

The processing circuitry 110 is arranged to search models of the field to find a model that best fits the field represented in the image set. In an example, where the image set includes multiple images, the processing circuitry is arranged to match a common feature of the field across the multiple images. Thus, the multiple images are registered to each other. Once aligned, differences in other parts of the image can provide the sensor pitch or height. In an example, this matching is an iterative process that stops when one of a quality metric is reached (e.g., the common feature is within a threshold distance between the multiple images) or a predefined number of iterations have elapsed. In this last example, a model that best fit the disparity between the multiple images when the iterations where halted is the selected model. An example of a system employing this iterative process is described with respect to FIG. 3.

In an example, where the image set is a single perspective (e.g., a single image), the models are a periodicity of crop rows or furrows. In an example, this matching is an iterative processes where different periodicities are compared against the crop rows or furrows in the single perspective image until a match is found. In an example, the models are finite. Here, a match is a model that is a better fit than other models.

In an example, to match the different periodicities, the processing circuitry 110 is arranged to segment the image to produce a set of image segments. In an example, segments in the set of image segments are scanlines (e.g., raster rows) of the image. Other example segments can include partial scanlines, multiple scanlines, a sampling of scanlines (e.g., not all scanlines), etc. Generally, each segment will include multiple crop related rows of one type (e.g., two or more furrows). In an example, the segments are sized to fit within a buffer (e.g., a register), such as in the memory 115. Such sizing can, in an example, enable efficient single instruction multiple data (SIMD) processing of the image. FIGS. 3A and 3B illustrate an example segmentation.

The processing circuitry 110 is arranged to shift a model across respective segments of the set of image segments to get a set of positions. The shifting is an example of a convolution on the image segments. The model, such as a sine wave, triangular wave, square wave, etc. is compared against the data in the image segment to fit to that data. Here, the set of positions are based on the models, such as the tops or bottoms of a sine wave.

In an example, shifting the model across respective segments includes shifting the model across several segments in parallel. That is, with respect to calculating the set of positions, the image segments are independent of each other. Thus, each image segment can yield a set of positions without impacting the processing of any other segment. This parallelism can benefit many hardware configurations, such as the SIMD capabilities of GPUS to quickly calculate the positions. The independent nature of these calculations can also be efficiently processed by clusters of processing circuits even if inter-circuit communications have high latencies, such as can occur in several FPGAs or ASICs communicating on a bus, between a co-processor and a processor, or even to other devices connected to the system 105 via a network (e.g., wired or wireless).

In an example, to shift the model across respective segments, the processing circuitry 110 is arranged to use a first period on a first segment and a second period on a second segment. In an example, the first period and the second period are respectively selected based on a respective position of the first segment and the second segment in the image. These examples address an issue whereby the perspective of the field provided by the sensor 120 results in a tapering of crop related rows as they move away from the sensor 120. Thus, for the same crop type, portions of the crop related rows will appear closer together at the top of the image than they will at the bottom of the image. Here, a different period (e.g., a shorter period) can be used for segments taken at the top of the image than those at the bottom of the image. In an example, the first period and the second period are based on a type of crop. Thus, once the type of crop is known, a specific set of periods for the given model can be used. In an example, the set of periods are arranged in order of the segmentation (e.g., top to bottom). This can speed retrieval of the periods from the memory 115, for example, via a block read or the like. In an example, the calibration parameter is derived from a user selection. Here, the user selects or inputs the crop, a crop row spacing, a center-of crop-to center of furrow distance, etc. at a user interface.

In an example, to shift the model across respective segments of the set of image segments to get the set of positions, the processing circuitry 110 is arranged to evaluate the model at a series of positions, starting from a first position, until an extremum is found. A position corresponding to the extremum is then added to the set of positions. In an example, the extremum is a maximum. For example, the value of any given pixel can be multiplied by the model (e.g., elements of the model), to achieve a first value. The model can then be shifted by one pixel and multiplied against the pixels of the image segment again. This process is repeated until a resulting value is smaller than a previous value. The previous position is then that which corresponds to the maximum. This shift-multiply-compare technique efficiently operates on several architectures, such as GPUs—where the several shifted models on a single segment can be processed in parallel and compared at the end of a clock cycle—or digital signal processors (DSPs). Also, by locating the position (e.g., centering a wave top on a crop row) via a maximum value across all visible crop rows, for example, the technique is resistant to noise due to row interruptions (e.g., weeds, missing crops, etc.).

In an example, to shift the model across respective segments of the set of image segments to get the set of positions, the processing circuitry 110 is arranged to transform the model and the respective segments of the set of image segments to corresponding representations (e.g., corresponding frequency spectrums) in the frequency domain, such as by using a Discrete Fourier Transform (DFT). The processing circuitry 110 is further configured to multiply frequencies of the frequency domain representation of the model with frequencies of the frequency domain representation of the respective data segments of the set of image segments. The result of such multiplication can then be transformed back to the space domain (e.g., by using an inverse DFT), scanned or evaluated to determine an extremum, weighted, and added to a set of positions or used to determine the match or fit of the model to the crop related rows of the respective segments, as described herein.

In an example, the model is a function whose frequency spectrum has a single frequency, such as a sine function. In such example, to shift the model across respective segments of the set of image segments to get the set of positions, the processing circuitry 110 is arranged to transform the respective segments of the set of segments to corresponding frequency spectrums in the frequency domain, and, for each frequency spectrum, select a frequency response that corresponds to a frequency of the model as the extremum. The location of the extremum can be calculated using an arctangent of a ratio of the imaginary component of the frequency response to the real component. Such location can be added to a set of positions or used to determine the match or fit of the model to the crop related rows of the respective segments, as described herein.

In another example, the model is a function whose frequency spectrum has a single frequency, such as a sine function. In such example, to shift the model across respective segments of the set of image segments to get the set of positions, the processing circuitry 110 is arranged to evaluate the model at a first position, such as by multiplying elements of the model with corresponding elements of a respective segment and summing the result to produce a first value. The processing circuitry 110 is further arranged to evaluate the model at a second position that is orthogonal to, or phase shifted 90 degrees from, the first position, to produce a second value. The location of the extremum can be calculated using an arctangent of a ratio of the first value to the second value. Such location can be added to a set of positions or used to determine the match or fit of the model to the crop related rows of the respective segments, as described herein.

The techniques described above to match the model are repeated with different periods of the models for a given image segment. The period that best fits the crop related rows of a given segment is the matching model. Example details are described with respect to FIGS. 4 and 5.

In an example, the models are a subset of field models. In an example, a type of crop can be received from a user (e.g., via a user interface) and the models can be selected from the field models based on the type of crop. These examples illustrate that the memory 115 can include several different models for a single crop, and also store several different sets of these crop-specific models. In an example, the matching can be performed across the different sets of crop-specific models. Here, not only can the sensor 120 position calibration parameters, but the crop can be determined. This crop selection calibration parameter can be used in other phases of the AEQ 125 navigation or control.

The processing circuitry 110 is arranged to extract a calibration parameter from the model selected above. In an example, the identified model is used as an index to a data set of available calibration parameters. Thus, the processing circuitry 110 uses the identified model to retrieve the calibration parameter from a database, for example, in the memory 115. In an example, the model is a data structure that includes the available calibration parameters. Here, the processing circuitry 110 parses the data structure to retrieve the calibration parameter. In an example, the calibration parameter is a height of the sensor that captured the image set. In an example, the calibration parameter is a pitch of the sensor that captured the image set. In an example, the calibration parameter is not a camera yaw of the sensor that captured the image set. In an example, the calibration parameter is not a camera roll of a camera that captured the image set.

The processing circuitry 110 is arranged to communicate the calibration parameter to a receiver. In an example, the calibration parameter is used to transform measurements made on images captured from the sensor 120 during navigation into navigational measurements, via a homography, used to control movement of the AEQ 125. Generally, a steering controller of the AEQ 125 is the receiver, however, an intermediary can also be the receiver where the intermediary uses the homography, and this the calibration parameter, to calculate the TKE and XTK values for the steering controller. In an example, the processing circuitry 110 is itself the receiver. In an example, the receiver is a data structure, or location, in the memory 115, that can be used by another component of the system 105.

Figure 2A:
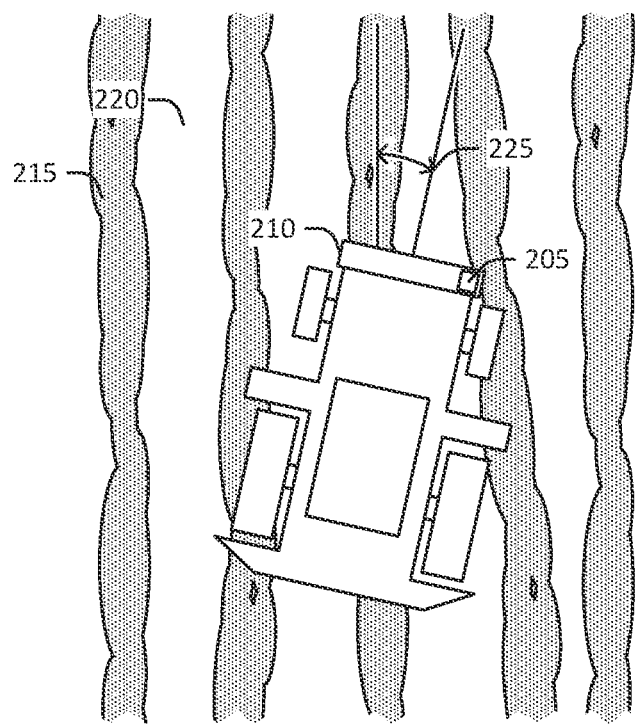
FIGS. 2A-2B illustrate various components and relationships of an AEQ in an operating environment, according to an embodiment.
Figure 2B:
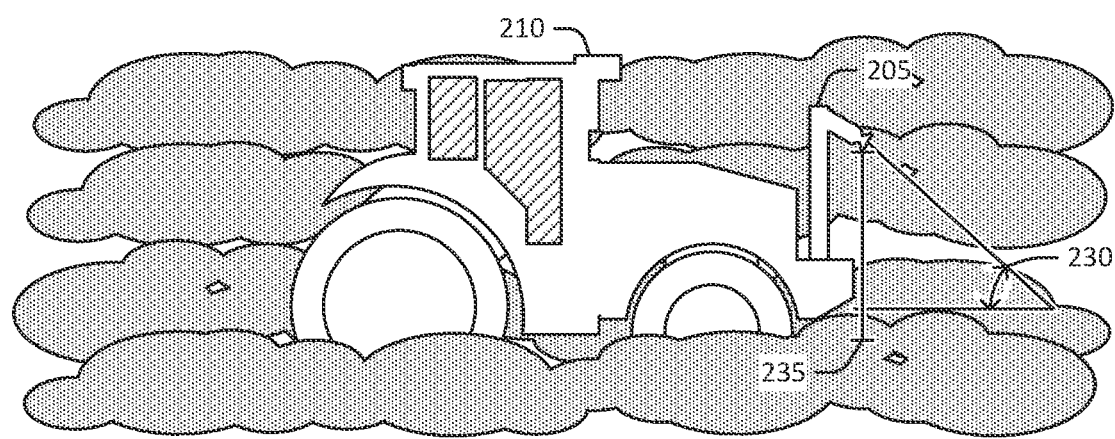

FIGS. 2A-2B illustrate various components and relationships of an AEQ in an operating environment, according to an embodiment. FIG. 2A is a top-down view of an AEQ 210 in a field. The shaded portions represent crop rows 215 and the space between the crop rows 215 are furrows 220. The AEQ 210 includes a sensor 205 mounted to the front side of the AEQ 210. Here, the AEQ 210 is not aligned with the crop rows 215 or furrows 220 but deviates by TKE 225. A steering controller of the AEQ 210 is arranged to steer the AEQ 210 to be in line with the crop rows 215 with wheels in the furrows 220.

FIG. 2B illustrated a side view of the AEQ 210 with the front mounted sensor 205. The height 235 of the sensor 205 and the angle to the ground 230 (e.g., pitch of the sensor 205) are calibration parameters for the CV system. It is these parameters that are automatically determined by the systems and techniques described herein.

Figure 3:
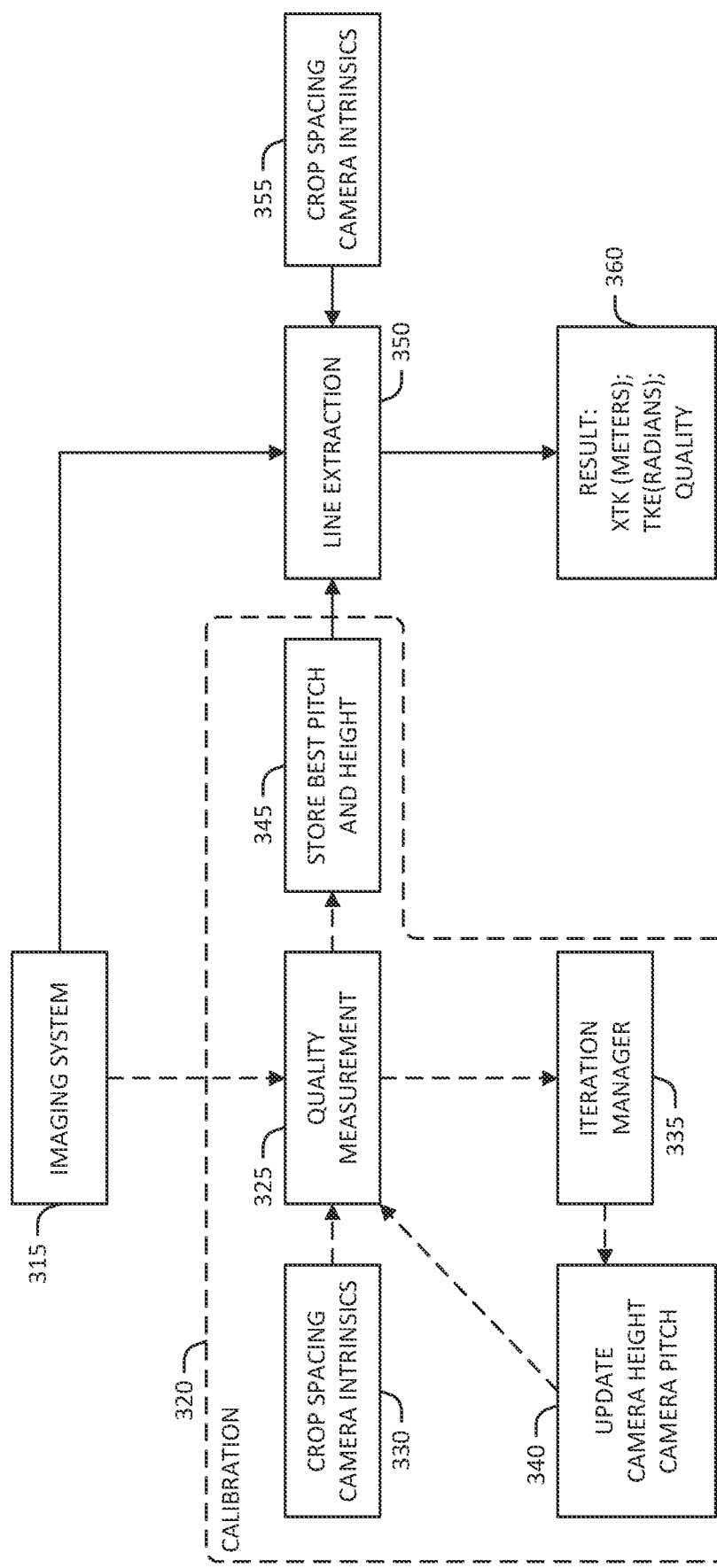
FIG. 3 illustrates a block diagram of a system for multiple perspective calibration, according to an embodiment.

FIG. 3 illustrates a block diagram of a system for multiple perspective calibration, according to an embodiment. Here, an imaging system 315 is used to capture image data. The image information, combined with known characteristics of the field (e.g., crop spacing data 355) and known characteristics of the sensor (best pitch and height 345), is used to calculate TKE and XTK 360.

When the system is not calibrated, the normalized image data is provided to a calibration component 320. The calibration component 320 includes an iteration manager 335 that modifies sensor pitch or height parameters 340 with each iteration and compares them to the normalized image. The result is tested at the quality measurement component 325 using the known crop characteristics 330. If the result is within a threshold, then the best pitch and height estimation of the sensor is stored 345 and can be used by the line extraction component 350. If the result is not within a threshold, then the iteration manager 335 repeats until quality measurement 325 is satisfied.

Figure 4:
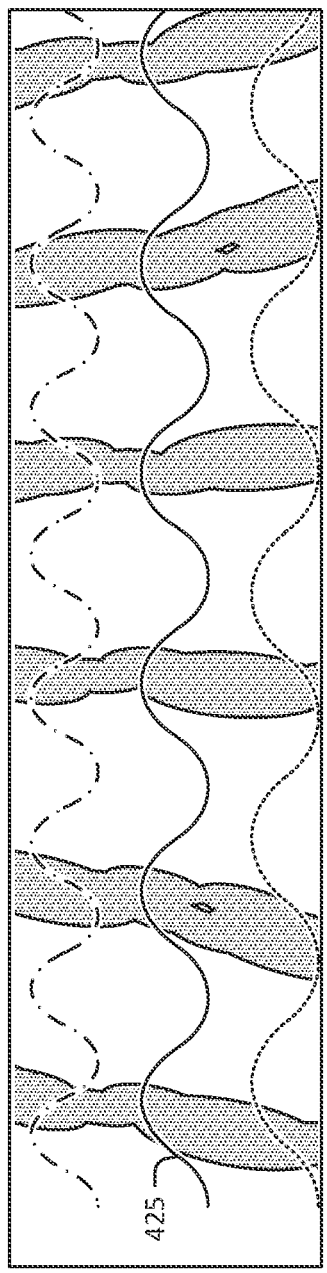
FIG. 4 illustrates fitting of a model to a segment of an image to implement a single perspective calibration, according to an embodiment.

FIG. 4 illustrates fitting of a model to a segment of an image to implement a single perspective calibration, according to an embodiment. Here, different periods for a model are tested to determine which matches the crop rows. The top period is too small, the bottom period is too large, and thus the middle period 425 is the best fit. The best fit period is generally specific to a given crop (e.g., the crop row placement or distance from each other) as well as which portion of the input image is used. At a given scanline of the image, for example, a lower scanline will likely have a longer period than a higher (e.g., closer to the top of the image) scanline due to the sensor's perspective. The specific period that matches a specific scanline, such as the bottom scanline, can be used to determine the height of the sensor. In an example, the relationship between periods at different scanlines can be used to determine the pitch of the sensor.

Figure 5:
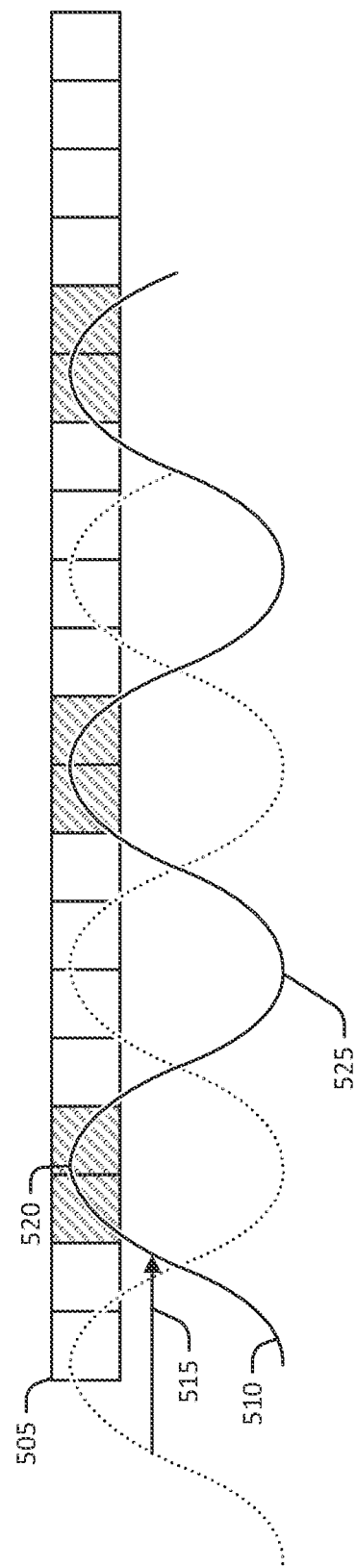
FIG. 5 illustrates a convolutional fitting of a model to a segment of an image, according to an embodiment, according to an embodiment.

FIG. 5 illustrates a convolutional fitting of a model to a segment of an image, according to an embodiment. In the illustrated example, the segment 505 is a scanline (e.g., horizontal row of pixels), where white pixels represent furrows and shaded pixels represent crop rows. The model 510 started in the position represented by the dots and was iteratively moved 515 to its current position. Here, the maxima 520 corresponds to the first center of the crop row pixels and the minimum corresponds to the first center of furrow pixels. Not that the other extremum of the model 510 can be used as respective centers for crop rows and furrows.

The illustration also highlights possible processing techniques. For example, each wavelength of the model can be represented as a pixel window, with each pixel in the window being multiplied by a value based on its position (e.g., the first pixel is multiplied by ten, the second by eight, the third by two, etc.) to represent the value of the model. The scanline can then be shifted by one pixel (e.g., the first pixel is discarded, all other pixels are shifted, and a new pixel is added in the last position) and the calculation re-run. Thus, the scanline can be segmented by the windows (e.g., offsets of a multiple of the window size) and provided as data to a SIMD processor to compute values in parallel. It is also possible to generate one or more models with different shifts, or different periods (e.g., different window sizes), by using different segments of the scanline and providing the segments to different execution units in the SIMD processor, effectively processing several tests in parallel.

Figure 6:
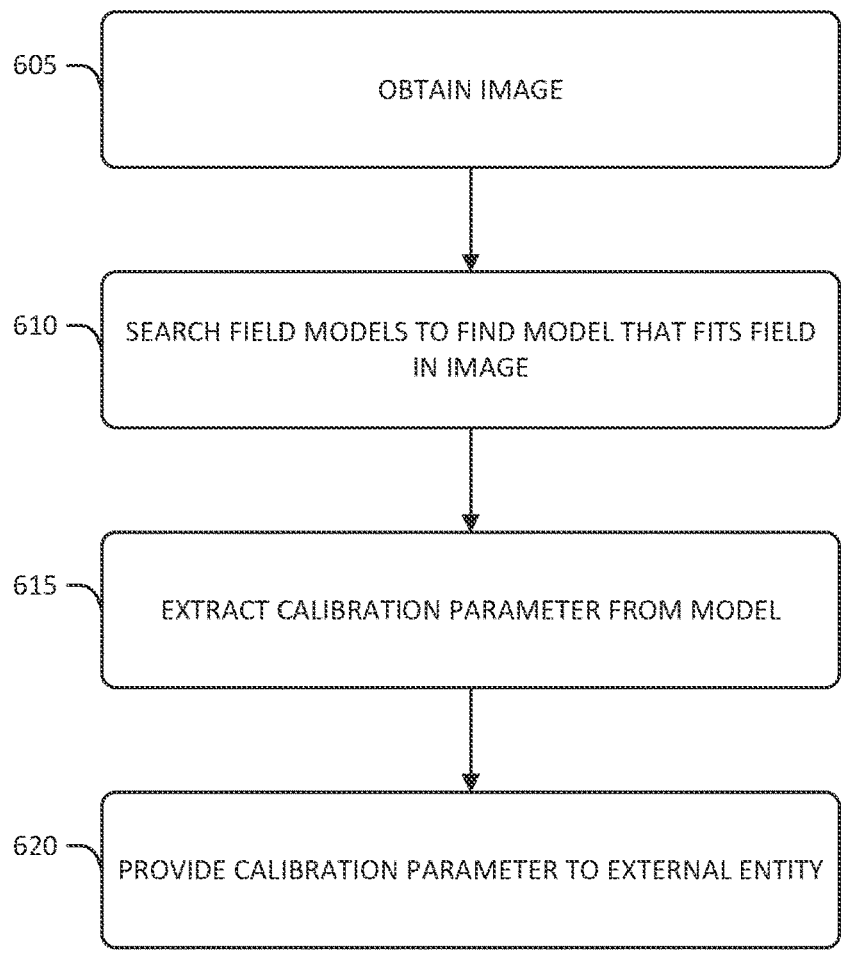
FIG. 6 illustrates a flow diagram of an example of a method for calibrating a crop row CV, according to an embodiment.

FIG. 6 illustrates a flow diagram of an example of a method for calibrating a crop row CV, according to an embodiment. The operations of the method 600 are performed on hardware, such as that described above or below (e.g., processing circuitry).

At operation 605, an image set of a field that includes crop rows and furrows is obtained. In an example, the image set includes multiple images from different perspectives. In an example, the multiple perspectives are from multiple sensors. In an example, the multiple perspectives are from a single sensor in two different physical positions (e.g., the sensor captures an image, moves, and then captures another image). In an example, the image set includes images from one perspective. In an example, the single perspective image is a color image. In an example, the single perspective image is an intensity image derived from a color image (e.g., multiple color channels are transformed into a single channel for pixels in the image).

At operation 610, models of the field are searched to find a model that best fits the field represented in the image set. In an example, where the image set includes multiple images, searching the models of the field include matching a common feature of the field across the multiple images. In an example, this matching is an iterative process that stops when one of a quality metric is reached (e.g., the common feature is within a threshold distance between the multiple images) or a predefined number of iterations have elapsed.

In an example, where the image set is a single perspective (e.g., a single image), the models are a periodicity of crop rows or furrows. In an example, this matching is an iterative processes where different periodicities are compared against the crop rows or furrows in the single perspective image until a match is found. In an example, the models are finite. Here, a match is a model that is a better fit than other models.

In an example, the models are a subset of field models. In an example, a type of crop can be received from a user (e.g., via a user interface) and the models can be selected from the field models based on the type of crop.

At operation 615, a calibration parameter is extracted from the model. In an example, the calibration parameter is a height of the sensor that captured the image set. In an example, the calibration parameter is a pitch of the sensor that captured the image set. In an example, the calibration parameter is not a camera yaw of the sensor that captured the image set. In an example, the calibration parameter is not a camera roll of a camera that captured the image set.

At operation 620, the calibration parameter is communicated to a receiver. In an example, the calibration parameter is used to transform measurements made on images captured from the sensor during navigation into navigational measurements, via a homography, used to control movement of the agricultural equipment.

Figure 7:
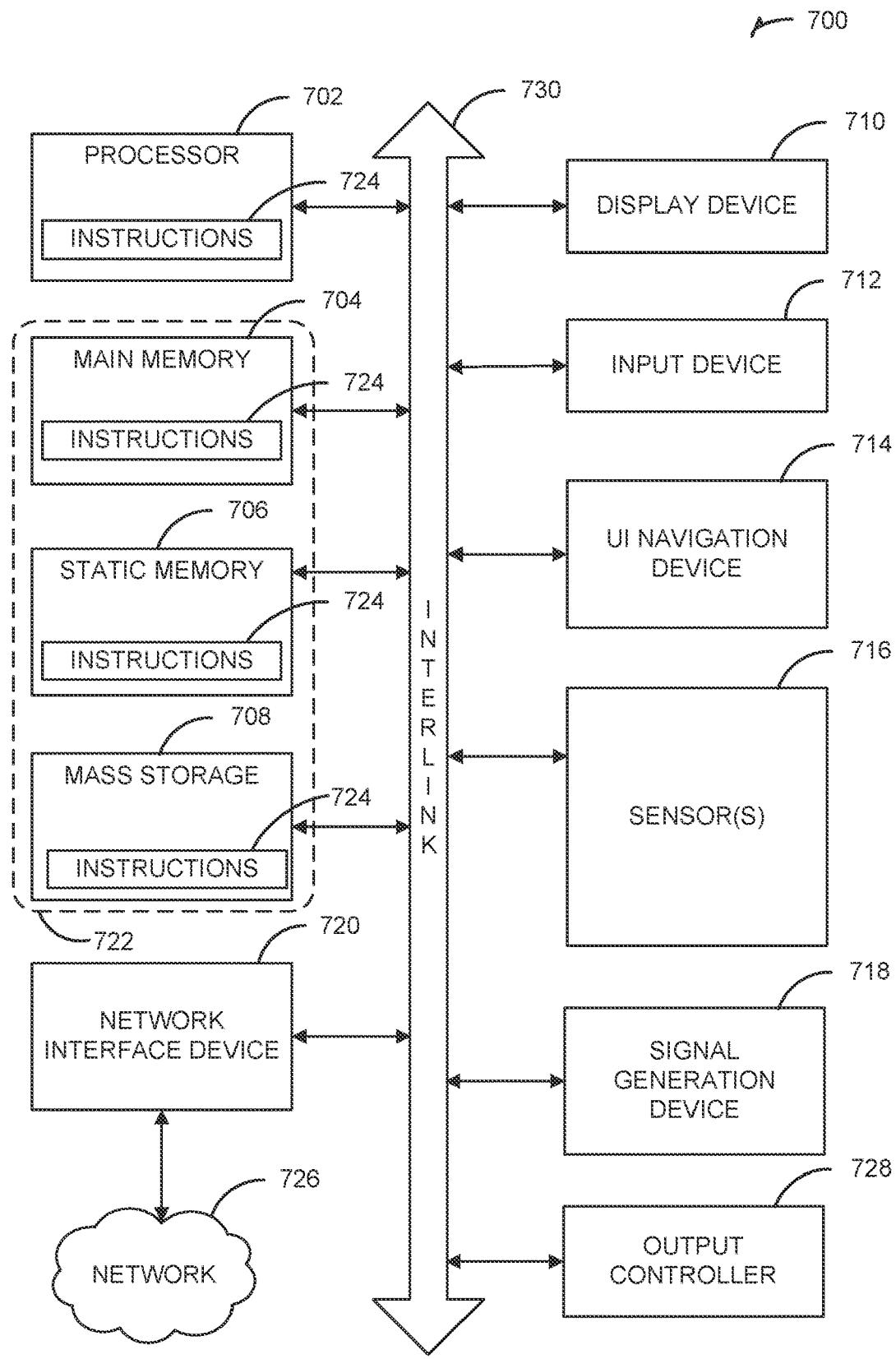
FIG. 7 is a block diagram illustrating an example of a machine upon which one or more embodiments can be implemented.

FIG. 7 illustrates a block diagram of an example machine 700 upon which any one or more of the techniques (e.g., methodologies) discussed herein can perform. Examples, as described herein, can include, or can operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 can include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which can communicate with each other via an interlink (e.g., bus) 730. The machine 70) can further include a display unit 710, an alphanumeric input device 712 (e.g., a keyboard), and a user interface (UI)

navigation device 714 (e.g., a mouse). In an example, the display unit 710, input device 712 and UI navigation device 714 can be a touch screen display. The machine 700 can additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 70) can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 can be, or include, a machine readable medium 722 on which is stored one or more sets of data structures or instructions 724 (e.g., software) embodying or utilized by any one or more of the techniques or functions described herein. The instructions 724 can also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 can constitute the machine readable media 722. While the machine readable medium 722 is illustrated as a single medium, the term "machine readable medium" can include a single medium or multiple media (e.g., a centralized or distributed database, and/or associated caches and servers) configured to store the one or more instructions 724.

The term "machine readable medium" can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 can be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is a device for calibrating a crop row computer vision system, the device comprising: a memory including instructions; and processing circuitry that is configured by the instructions to: obtain an image set of a field that includes, crop rows and furrows; search models of the field to find a model that best fits the field represented in the image set; extract a calibration parameter from the model; and communicate the calibration parameter to a receiver.

In Example 2, the subject matter of Example 1 includes, wherein the image set includes multiple images from different perspectives.

In Example 3, the subject matter of Example 2 includes, wherein, to search the models of the field, the processing circuitry is configured by the instructions to match a common feature of the field across the multiple images.

In Example 4, the subject matter of Example 3 includes, wherein the processing circuitry is configured by the instructions to iteratively perform the matching until one of a quality metric is reached or a predefined number of iterations have elapsed.

In Example 5, the subject matter of Examples 1-4 includes, where the image set includes images from one perspective.

In Example 6, the subject matter of Example 5 includes, wherein the models are a periodicity of crop rows or furrows.

In Example 7, the subject matter of Example 6 includes, wherein the processing circuitry is configured by the instructions to iteratively compare different periodicities against the crop rows or furrows until a match is found.

In Example 8, the subject matter of Example 7 includes, wherein the models are finite, and wherein a match is a model that is a better fit than other models.

In Example 9, the subject matter of Examples 1-8 includes, wherein the models are a subset of field models.

In Example 10, the subject matter of Example 9 includes, wherein the processing circuitry is configured by the instructions to: receive, from a user, a type of crop; and select the models from the field models based on the type of crop.

In Example 11, the subject matter of Examples 1-10 includes, wherein the calibration parameter is a height of a sensor that captured the image set.

In Example 12, the subject matter of Examples 1-II includes, wherein the calibration parameter is a pitch of a sensor that captured the image set.

In Example 13, the subject matter of Examples 1-12 includes, wherein the calibration parameter is not a yaw of a sensor that captured the image set.

In Example 14, the subject matter of Examples 1-13 includes, wherein the calibration parameter is not a roll of a sensor that captured the image set.

In Example 15, the subject matter of Examples 1-14 includes, wherein the calibration parameter is used to transform measurements made on images captured from the sensor during navigation into navigational measurements, via a homography, used to control movement of the agricultural equipment.

Example 16 is a method for calibrating a crop row computer vision system, the method comprising: obtaining an image set of a field that includes, crop rows and furrows; searching models of the field to find a model that best fits the field represented in the image set; extracting a calibration parameter from the model; and communicating the calibration parameter to a receiver.

In Example 17, the subject matter of Example 16 includes, wherein the image set includes multiple images from different perspectives.

In Example 18, the subject matter of Example 17 includes, wherein searching the models of the field includes matching a common feature of the field across the multiple images.

In Example 19, the subject matter of Example 18 includes, wherein the matching is an iterative process that stops when one of a quality metric is reached or a predefined number of iterations have elapsed.

In Example 20, the subject matter of Examples 16-19 includes, where the image set includes images from one perspective.

In Example 21, the subject matter of Example 20 includes, wherein the models are a periodicity of crop rows or furrows.

In Example 22, the subject matter of Example 21 includes, wherein the matching is an iterative processes where different periodicities are compared against the crop rows or furrows until a match is found.

In Example 23, the subject matter of Example 22 includes, wherein the models are finite, and wherein a match is a model that is a better fit than other models.

In Example 24, the subject matter of Examples 16-23 includes, wherein the models are a subset of field models.

In Example 25, the subject matter of Example 24 includes, receiving, from a user, a type of crop; and selecting the models from the field models based on the type of crop.

In Example 26, the subject matter of Examples 16-25 includes, wherein the calibration parameter is a height of a sensor that captured the image set.

In Example 27, the subject matter of Examples 16-26 includes, wherein the calibration parameter is a pitch of a sensor that captured the image set.

In Example 28, the subject matter of Examples 16-27 includes, wherein the calibration parameter is not a yaw of a sensor that captured the image set.

In Example 29, the subject matter of Examples 16-28 includes, wherein the calibration parameter is not a roll of a sensor that captured the image set.

In Example 30, the subject matter of Examples 16-29 includes, wherein the calibration parameter is used to transform measurements made on images captured from the sensor during navigation into navigational measurements, via a homography, used to control movement of the agricultural equipment.

Example 31 is a machine readable medium including instructions for calibrating a crop row computer vision system, the instructions, when executed by processing circuitry, cause the processing circuitry to perform operations comprising: obtaining an image set of a field that includes, crop rows and furrows; searching models of the field to find a model that best fits the field represented in the image set; extracting a calibration parameter from the model; and communicating the calibration parameter to a receiver.

In Example 32, the subject matter of Example 31 includes, wherein the image set includes multiple images from different perspectives.

In Example 33, the subject matter of Example 32 includes, wherein searching the models of the field includes matching a common feature of the field across the multiple images.

In Example 34, the subject matter of Example 33 includes, wherein the matching is an iterative process that stops when one of a quality metric is reached or a predefined number of iterations have elapsed.

In Example 35, the subject matter of Examples 31-34 includes, where the image set includes images from one perspective.

In Example 36, the subject matter of Example 35 includes, wherein the models are a periodicity of crop rows or furrows.

In Example 37, the subject matter of Example 36 includes, wherein the matching is an iterative processes where different periodicities are compared against the crop rows or furrows until a match is found.

In Example 38, the subject matter of Example 37 includes, wherein the models are finite, and wherein a match is a model that is a better fit than other models.

In Example 39, the subject matter of Examples 31-38 includes, wherein the models are a subset of field models.

In Example 40, the subject matter of Example 39 includes, wherein the operations comprise: receiving, from a user, a type of crop; and selecting the models from the field models based on the type of crop.

In Example 41, the subject matter of Examples 31-40 includes, wherein the calibration parameter is a height of a sensor that captured the image set.

In Example 42, the subject matter of Examples 31-41 includes, wherein the calibration parameter is a pitch of a sensor that captured the image set.

In Example 43, the subject matter of Examples 31-42 includes, wherein the calibration parameter is not a yaw of a sensor that captured the image set.

In Example 44, the subject matter of Examples 31-43 includes, wherein the calibration parameter is not a roll of a sensor that captured the image set.

In Example 45, the subject matter of Examples 31-44 includes, wherein the calibration parameter is used to transform measurements made on images captured from the sensor during navigation into navigational measurements, via a homography, used to control movement of the agricultural equipment.

Example 46 is a system for calibrating crop row computer vision, the system comprising: means for obtaining an image set of a field that includes, crop rows and furrows; means for searching models of the field to find a model that best fits the field represented in the image set; means for extracting a calibration parameter from the model; and means for communicating the calibration parameter to a receiver.

In Example 47, the subject matter of Example 46 includes, wherein the image set includes multiple images from different perspectives.

In Example 48, the subject matter of Example 47 includes, wherein the means for searching the models of the field include means for matching a common feature of the field across the multiple images.

In Example 49, the subject matter of Example 48 includes, wherein the means for matching is iterative and stops when one of a quality metric is reached or a predefined number of iterations have elapsed.

In Example 50, the subject matter of Examples 46-49 includes, where the image set includes images from one perspective.

In Example 51, the subject matter of Example 50 includes, wherein the models are a periodicity of crop rows or furrows.

In Example 52, the subject matter of Example 51 includes, wherein the means for matching is iterative in which different periodicities are compared against the crop rows or furrows until a match is found.

In Example 53, the subject matter of Example 52 includes, wherein the models are finite, and wherein a match is a model that is a better fit than other models.

In Example 54, the subject matter of Examples 46-53 includes, wherein the models are a subset of field models.

In Example 55, the subject matter of Example 54 includes, means for receiving, from a user, a type of crop; and means for selecting the models from the field models based on the type of crop.

In Example 56, the subject matter of Examples 46-55 includes, wherein the calibration parameter is a height of a sensor that captured the image set.

In Example 57, the subject matter of Examples 46-56 includes, wherein the calibration parameter is a pitch of a sensor that captured the image set.

In Example 58, the subject matter of Examples 46-57 includes, wherein the calibration parameter is not a yaw of a sensor that captured the image set.

In Example 59, the subject matter of Examples 46-58 includes, wherein the calibration parameter is not a roll of a sensor that captured the image set.

In Example 60, the subject matter of Examples 46-59 includes, wherein the calibration parameter is used to transform measurements made on images captured from the sensor during navigation into navigational measurements, via a homography, used to control movement of the agricultural equipment.

Example 61 is at least one machine-readable medium including instructions that, when executed by processing circuitry, cause the processing circuitry to perform operations to implement of any of Examples 1-60.

Example 62 is an apparatus comprising means to implement of any of Examples 1-60.

Example 63 is a system to implement of any of Examples 1-60.

Example 64 is a method to implement of any of Examples 1-60.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for calibrating a crop row computer vision system, the device comprising:
 a memory including instructions; and
 processing circuitry that is configured by the instructions to:
  obtain a set of one or more images of a field that includes crop rows and furrows, the set of one or more images captured by a sensor associated with the computer vision system;
  iteratively test a set of models on an image from the set of one or more images to select a model of the field, the test based on a correspondence between a periodic component of the model and the crop rows or the furrows in the image, an iteration including:
   a selection of a period for a function as a current model;

a test of the current model for correspondence between a feature of the function and the crop rows or the furrows in the image to produce a value; and a determination of whether the value is better than a previous value from a previous iteration, iterations terminating in response to a predefined iteration limit being reached or to the value being worse than the previous value indicating a maximum extremum is reached, the model corresponding to the maximum extremum, the period selected at a next iteration to move towards the maximum extremum based on the determination of whether the value is better than the previous value from the previous iteration;

determine a scaling of crop rows or furrows in the image using the model;

determine a calibration parameter that is indicative of a configuration of the sensor relative to the field based on the scaling of crops rows or furrows; and communicate the calibration parameter to a receiver.

2. The device of claim 1, wherein a convolution of the model is applied across the image to test the model.

3. The device of claim 2, wherein the convolution is horizontal.

4. The device of claim 2, wherein the convolution is vertical.

5. The device of claim 4, wherein the image is divided into horizontal segments with different vertical positions in the image, and wherein the model is tested on multiple of the horizontal segments to produce the convolution.

6. The device of claim 5, wherein the processing circuitry is configured to perform the test of the model on the multiple horizontal segments in parallel.

7. The device of claim 5, wherein the calibration parameter is a pitch of a sensor that captured the set of one or more images, and wherein the pitch is determined by different periods selected as maximum extremum in different horizontal segments.

8. The device of claim 5, wherein a horizontal segment is a scanline of the image.

9. The device of claim 1, wherein the function is a wave.

10. The device of claim 9, wherein the feature of the function is a top of the wave or a bottom of the wave.

11. The device of claim 1, wherein the calibration parameter is a height of a sensor that captured the set of one or more images.

12. The device of claim 1, wherein the calibration parameter is used to transform measurements made on images captured from the sensor during navigation into navigational measurements, via a homography, used to control movement of agricultural equipment.

13. A method for calibrating a crop row computer vision system, the method comprising:

obtaining a set of one or more images of a field that includes crop rows and furrows, the set of one or more images captured by a sensor associated with the computer vision system;

iteratively testing a set of models on an image from the set of one or more images to select a model of the field, the testing based on a correspondence between a periodic component of the model and the crop rows or the furrows in the image, an iteration including:

selecting a period for a function as a current model;

testing the current model for correspondence between a feature of the function and the crop rows or the furrows in the image to produce a value; and determining whether the value is better than a previous value from a previous iteration, iterations terminating in response to a predefined iteration limit being reached or to the value being worse than the previous value indicating a maximum extremum is reached, the model corresponding to the maximum extremum, the period selected at a next iteration to move towards the maximum extremum based on the determination of whether the value is better than the previous value from the previous iteration;

determining a scaling of crop rows or furrows in the image using the model;

determining a calibration parameter that is indicative of a configuration of the sensor relative to the field based on the scaling of crops rows or furrows; and communicating the calibration parameter to a receiver.

14. The method of claim 13, wherein a convolution of the model is applied across the image during testing.

15. The method of claim 14, wherein the convolution is vertical.

16. The method of claim 15 wherein the image is divided into horizontal segments with different vertical positions in the image, and wherein the model is tested on multiple of the horizontal segments to produce the convolution.

17. The method of claim 16, wherein the calibration parameter is a pitch of a sensor that captured the set of one or more images, and wherein the pitch is determined by different periods selected as maximum extremum in different horizontal segments.

18. The method of claim 13, wherein the function is a wave, and wherein the feature of the function is a top of the wave or a bottom of the wave.

19. The method of claim 13, wherein the calibration parameter is a height of a sensor that captured the set of one or more images.

20. The method of claim 13, wherein the calibration parameter is used to transform measurements made on images captured from the sensor during navigation into navigational measurements, via a homography, used to control movement of agricultural equipment.

* * * * *

UNITED STATES PATENT AND TRADEMARK OFFICE
CERTIFICATE OF CORRECTION

PATENT NO. : 11,659,783 B2
APPLICATION NO. : 17/505302
DATED : May 30, 2023
INVENTOR(S) : Sneyders et al.

It is certified that error appears in the above-identified patent and that said Letters Patent is hereby corrected as shown below:

In the Specification

In Column 4, Line 28, delete "detection." and insert --detection,-- therefor

In Column 10, Line 65, delete "70)" and insert --700-- therefor

In Column 11, Line 8, delete "70)" and insert --700-- therefor

In Column 11, Line 65, delete "networks)." and insert --networks),-- therefor

In Column 12, Line 65, delete "Examples 1-II" and insert --Examples 1-11-- therefor In Column 16, Line 27, delete ""first."" and insert --"first,"-- therefor In Column 16, Line 27, delete ""third."" and insert --"third,"-- therefor Signed and Sealed this
Seventeenth Day of September, 2024

Katherine Kelly Vidal
*Director of the United States Patent and Trademark Office*